United States Patent [19]
Steele

[11] 3,856,289
[45] Dec. 24, 1974

[54] FORCE TRANSMITTING SYSTEM

[75] Inventor: Wallace Lee Roy Steele, Lathrup Village, Mich.

[73] Assignee: The United States of America as represented by the Secretary of the Army, Washington, D.C.

[22] Filed: Mar. 29, 1973

[21] Appl. No.: 346,197

Related U.S. Application Data

[63] Continuation-in-part of Ser. No. 155,697, June 23, 1971.

[52] U.S. Cl.................... 267/154, 267/149, 267/57
[51] Int. Cl................................................ F16f 1/16
[58] Field of Search........................ 267/57, 149, 154

[56] References Cited
UNITED STATES PATENTS

| | | | |
|---|---|---|---|
| 2,163,131 | 6/1939 | Porsche | 267/57 |
| 2,573,361 | 10/1951 | Rodgers, Jr. et al. | 267/57 |
| 3,490,756 | 1/1970 | Spier | 267/154 |

*Primary Examiner*—James B. Marbert
*Attorney, Agent, or Firm*—Peter Taucher; John McRae; Robert Gibson

[57] ABSTRACT

The system is a torsion bar of which the torsion element is a fiber glass tube having metal anchors. The fiber glass has a low Young's modulus to provide flexibility, and the high Young's modulus metal anchors provide strength. The tube is not bonded to an anchor, but the two are secured by two tapered elastomeric annuli in the anchor body, which arrangement allows the tube to deflect relative to the anchor from a maximum at the thick end of the annuli to a minimum at the thin end.

18 Claims, 4 Drawing Figures

FORCE TRANSMITTING SYSTEM

CROSS REFERENCE TO A RELATED CASE

This application is a continuation-in-part of my application Ser. No. 155,697, filed June 23, 1971, and I claim the filing date of the parent case as to all common patentable subject matter.

The invention described herein may be manufactured, used, and licensed by or for the Government for governmental purposes without payment to me of any royalty thereon.

BACKGROUND OF THE INVENTION

1. Field of the Invention.

The invention relates to torsion bars for use in suspension systems, as for example, the suspension system of a vehicle. It is desirable, in many applications, that the torsion element be relatively readily deflected, i.e., have a low modulus of elasticity - in order to provide the amount of deflection necessary to absorb the impact shocks to be encountered. However, the materials having such characteristics are not likely to have the necessary strength for use as anchors for securing the torsion element at either or both ends. When a high-modulus anchor is used with a low-modulus torsion element, a problem of securing the two is encountered.

What is usually involved is a torsion element of a substance like fiber glass secured to a metal anchor. The torsion element usually has an external cylindrical form fitting into a cylindrical socket in the anchor. If the two are bonded together in the socket, the bond fails because the fiber glass torsion bar deflects much more than the metal socket.

2. The Prior Art.

Applicant is informed and believes that fiber glass rods have been used as drive shafts in one or more helicopter power applications, but is unaware that the helicopter drive used a fiber glass rod and metal anchor anything like his invention. Applicant is unaware of any commercial use of fiber glass rods in vehicle suspension applications.

To applicant's knowledge, commercial torsion bar suspension systems have used metal in torsion, which did not and do not present the problems encountered in the use of a low-modulus torsion element secured to a high-modulus anchor. The use of a torsion bar made of a low-modulus material has advantages over conventional suspensions in situations involving limited space, limited weight, availability of metal alloys, cost considerations, and the like.

SUMMARY OF THE INVENTION

The invention is a torsion bar consisting of a low-modulus torsion element (a fiber glass tube) secured to a high-modulus anchor (a metal grip), the securing means being two tapered elastomeric annuli which permit angular deflection of the torsion element relative to the anchor, the deflection varying from a maximum at the thick ends of the elastomeric annuli to a minimum at the thin ends. It is an object of the invention to provide such a torsion bar.

PROBLEMS IN TORSION BAR TECHNOLOGY

A torsion bar consisting of a low-modulus torsion element surface bonded to a high-modulus anchor presents problems in that any given torque deflects the torsion element much more than it does the anchor. The problem is not solved by simply anchoring the torsion element in a grip which allows of no deflection within the grip, because such a combination creates a stress concentration at the plane of entry of the torsion element in the grip, which causes failure of the torsion element.

Applicant has discovered a solution in a torsion bar incorporating securing means between the torsion element and the anchor which allows the torsion element to deflect relative to the anchor throughout the anchored terminal zone of the torsion element, from a maximum at the plane where the torsion element begins to be secured to the anchor to a minimum (substantially zero) at the free end of the terminal zone.

As here used "terminal zone" means that length of torsion element which is engaged by the means securing the element to the anchor. The securing means of this discovery is elastomeric. In this embodiment, the torsion element is tubular, and two elastomeric rings engage the tube and the anchor; in the preferred form, each elastomeric ring (or annulus) is tapered, being thickest at the plane of maximum deflection of the torsion element relative to the anchor.

Because the relative deflection of torsion element to anchor takes place in the two elastomeric annuli, it will be understood that the amount of deflection is a function of the thickness of elastomer between the two surfaces which a ring secures, and as long as there is a film of elastomer between the two surfaces, relative deflection is possible. Theoretically, the annulus could taper down to a geometric line, such as the line of intersection of a cone and a cylinder. In such a structure, the elastic deflection of torsion element to anchor at that line of intersection would be zero.

Moreover, it is here noted that a firm adhesive bond between torsion element and anchor admits of no relative displacement, because as soon as such displacement occurs, the "bond" no longer exists. Accordingly, the two elastomeric annuli should be approximately the same thickness throughout the terminal zone, because if one annulus tapers down to zero at a plane terminating the zone and the other annulus has a finite thickness in the plane, the relative deflection of torsion element to anchor is of necessity zero for zero elastomer thickness. Such an inequality in thickness of the two annuli in any given plane will necessarily set up unequal stresses in the annuli, could result in critical overloading of one ring of elastomer, and could mean failure of the entire force transmitting system.

DESCRIPTION OF A PREFERRED EMBODIMENT

Figure 1:
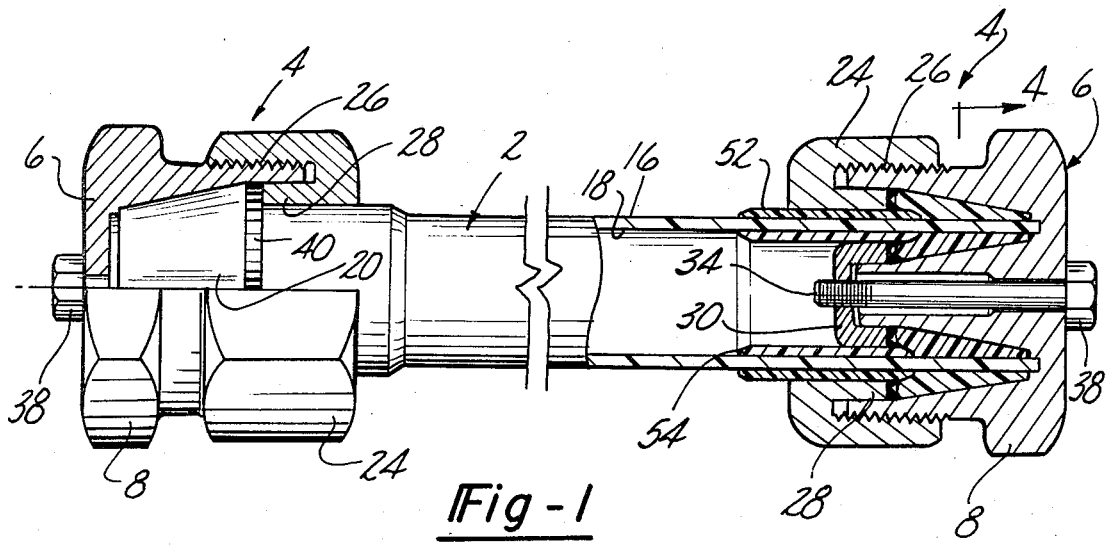
FIG. 1 is a view of a torsion bar embodying the claimed Force Transmitting System, being basically a side elevation view, with parts broken away and in section.

FIG. 1 shows a force transmitting system of indefinite length, the disclosure being of a "complete" system in the sense that an elongated torsion element of a low-modulus material is shown as having an anchor of a high modulus material secured to each end, so that a torque input can be imparted to the system by way of one anchor and a torque output can be derived from the system by way of the other anchor.

More specifically, the low-modulus element is here shown as a fiber glass tube 2. So that a torque may readily be transmitted to or taken from the anchors, each anchor presents an external surface which is capable of engagement by a rotating driving or driven element (not shown) in a manner to prevent slippage of the anchor relative to the driving or driven element. Toward that end, the driving or driven element and the anchors may be conventionally non-circular, or could merely drive through a friction grip where the input and output connections (not shown) have substantially the same modulus of elasticity as the anchors. Such conventional expedients as splines, keys, or noncircular cross sections may be utilized, and anchors 4 are shown here as having, each of them, a socket element 6 of which the most prominent external surface is hexagonal as at 8. Each "hex head" 8 is thus adapted to be engaged by a similarly shaped machine element which will be a driver at one end and be driven by the other end.

Figure 2:
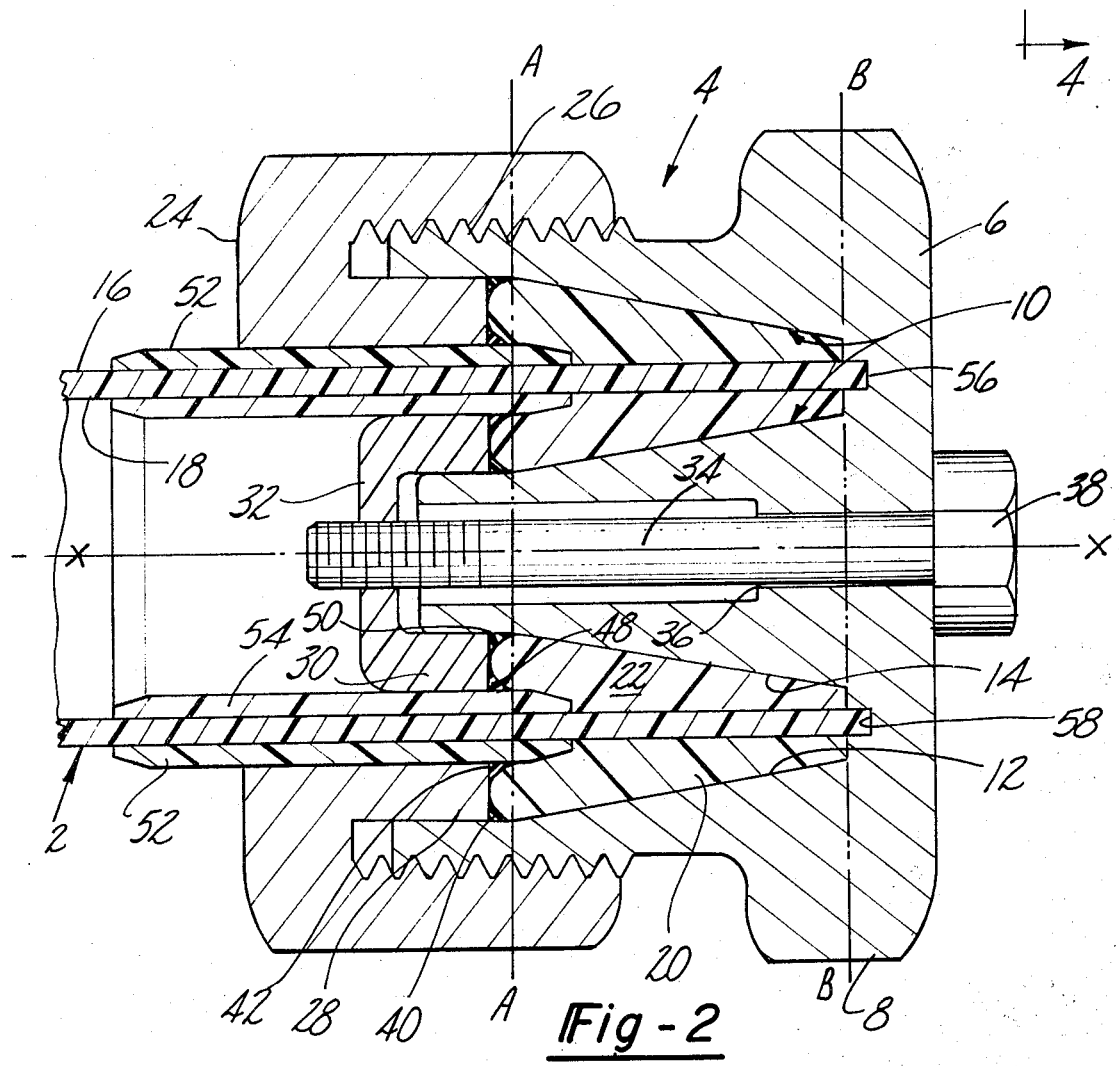
FIG. 2 is an enlargement of the section shown at the right end of FIG. 1.
Figure 4:
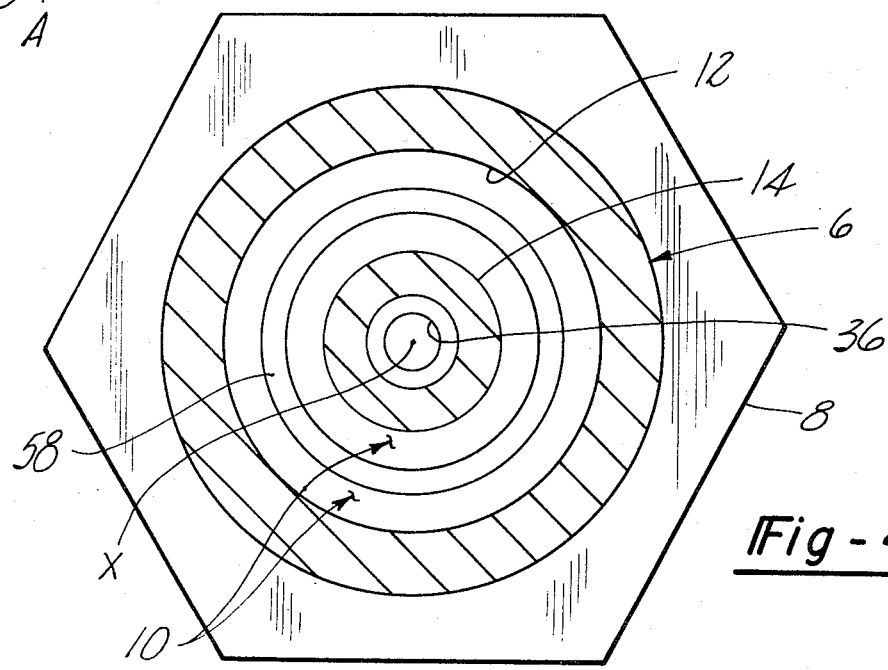
FIG. 4 is a view in section on line 4—4 of FIG. 1, on a larger scale than that of FIG. 1, and showing only the socket element.

Except for the hex head on the illustrated preferred embodiment, it will be understood that a transverse section of socket element 6 (FIG. 4) shows the socket element details to be circular in shape, i.e., symmetrical about the axis of the system, shown in FIG. 4 as a point X, and shown in FIG. 2 as X—X.

Each socket element 6 is provided with a socket to receive an end of the torsion element. Where that element is a tube as here shown at 2, said socket is of annular shape, as shown at 10, and having an outer surface 12 and an inner surface 14. (As the terms "outer" and "inner" are here used in reference to surfaces 12 and 14, they mean that "outer" surface 12 is further out radially from axis X—X than "inner" surface 14. See especially FIG. 4.) Both surfaces are tapered as can be seen in each of FIGS. 1, 2 and 3. The tapered annular space defined by the two surfaces 12 and 14 diverges in a direction away from its included end of tube 2. Moreover, each surface 12 and 14 diverges in relation to its adjacent cylindrical surface of tube 2, in a direction away from said tube end.

Where the torsion element is tubular as here shown, the terminal zone presents an external cylindrical surface 16, and an internal cylindrical surface 18. In transverse section, the indicated surfaces are preferably circular as will be understood by those skilled in the art.

Between external surface 16 of tube 2 and tapered outer surface 12 of the socket there is what is here claimed as a first tapered annular space which is substantially filled by an elastomeric annulus 20. Similarly, between internal surface 18 of tube 2 and tapered inner surface 14 of the socket there is what is here claimed as a second tapered annular space which is substantially filled by another elastomeric annulus 22.

Anchor 4 comprises aforesaid socket element 6 and a nut element 24; elements 6 and 24 are in engagement by means of a screw thread 26. Element 24 is provided with a pressure ring 28 adapted to engage the thick end of elastomeric annulus 20 which is preferably tapered in order better to fit the aforesaid first tapered annular space.

Similarly, elastomeric annulus 22 is pressed into contact with the boundaries of the second tapered annular space by means of a pressure ring 30 having a hub 32 which is threadedly engaged by a bolt 34 extending through an opening 36 in socket element 6, whereby bolt head 38 of bolt 34 is accessible to adjust the pressure that ring 30 applies to elastomeric annulus 22.

Figure 3:
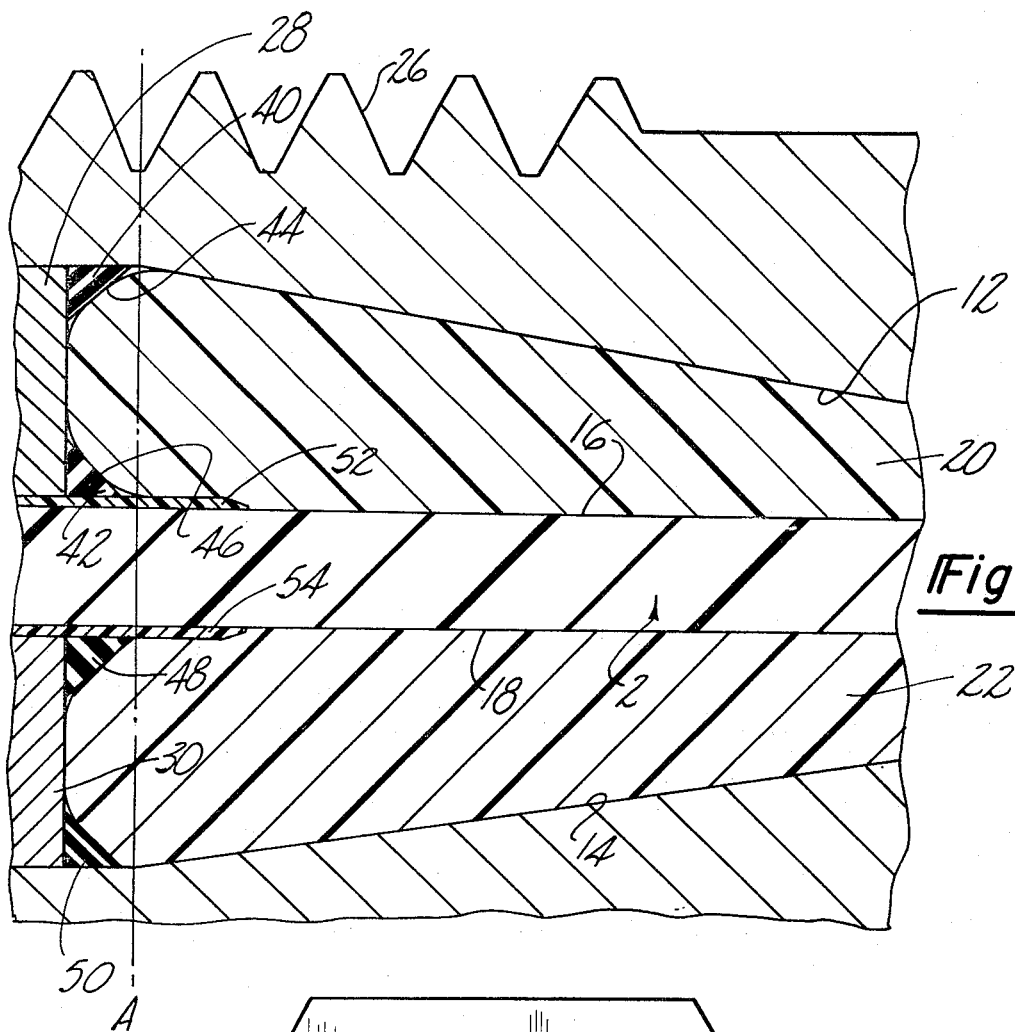
FIG. 3 is an enlarged view of a detail of FIGS. 1 and 2.

Depending on the hardness of elastomeric annuli 20 and 22, pressure rings 28 and 30 may engage the two elastomeric bodies directly, or through some means such as washers 40 and 42. As can best be seen in FIG. 3, washers 40 and 42 have tapered engaging surfaces 44, 46 respectively. In the cross-sectional views shown, washers 40 and 42 appear as right triangles, and they are oriented with the hypotenuses (the tapered surfaces) in engagement with elastomeric annulus 20. The result is that the mass of elastomer pushes the material of the washers against the cylindrical walls of the annular space occupied by pressure ring 28 to keep the elastomer from extruding in a longitudinal direction out of said first tapered annular space (toward the left as seen in FIGS. 2 and 3.)

In a similar manner, pressure ring 30 may also bear against elastomeric annulus 22 through the medium of washers 48 and 50, which need not be detailed in view of the above description of washers 40 and 42.

Washers 40, 42, 48 and 50 are preferably also elastomeric, and their hardness will be determined by the thickness of the cylindrical gaps covered by them; by the amount of pressure necessarily brought to bear on elastomeric annuli 20, 22; by the frequency and amplitude of the oscillations of tube 2; by the loads imposed on the suspension device of which the force transmitting system is a part; by the hardness (or extrudability) of annuli 20 and 22; by the required life cycle of the system; and by other parameters that will be apparent to those skilled in the art.

Because the low-modulus material (such as fiber glass) of which torsion element 2 is made is subject to damage by abrasive contact with metal, element 2 is preferably covered on its external surface 16 by a thin hard synthetic resin sleeve 52 bonded to surface 16 in that region of the surface which contacts nut element 24. When torsion element 2 is a tube, a similar sleeve 54 is bonded to internal surface 18 to protect tube 2 from frequent abrasive contact with ring 30.

Sleeves 52 and 54 may and probably will have still a third modulus of elasticity, different from those of tube 2 and socket element 6; accordingly, the various pieces are preferably dimensioned so that sleeves 52, 54 will transmit a minimum of the torque involved. Toward that objective, sleeves 52 and 54 are very thin, being shown in FIGS. 1 and 2 much thicker than they actually are just so they can be seen.

The foregoing discusses provisions for keeping the elastomer of annuli 20, 22 from extruding leftward as seen in FIG. 2. It is also desirable to prevent flow of elastomer around the free end 56 of tube 2. Toward that objective, the closed end of the tapered annular socket in element 6 is preferably provided with a groove 58 to receive the end 56. The principal purpose is to keep elastomer away from the end surface 56 so as to prevent ejection of torsion element 2 out of the socket by the fluid pressure which would be acting on said surface 56 in the same way as oil under pressure would push against a piston in a hydraulic ram.

"Terminal zone" is hereinabove defined as the length of torsion element engaged by the means securing the element to the anchor. As seen in FIG. 2, the boundaries of the terminal zone, as defined, are identified by planes perpendicular to the tubular axis and appearing in FIG. 2 as lines (the edges of said boundary planes) A—A and B—B. Deflection in the terminal zone of tube 2 relative to anchor 4 is at a maximum at plane A—A, and is a minimum at plane B—B; because the securing means tapers in thickness between these two planes, the deflection varies smoothly between them with no abrupt changes, i.e., no stress concentrations, appearing.

The fact that it may sometimes be difficult to determine by visual observation precisely where plane A—A is located is not critical. The terminal zone is still as defined above, even though it may not be possible to mark plane A—A with a visible line on the device, because of not knowing precisely where the thick end of an elastomeric annulus is compressed tightly enough against its confining walls to be "engaged" with either or both walls. Geometric precision in physically marking the circle of intersection is not required. It suffices that the means securing the tube and the anchor allows relative deflection from a maximum to a minimum while avoiding stress concentrations.

It will moreover be evident to persons skilled in the art that a longer terminal zone will be less conducive to failure (all other factors being equal) than a short terminal zone. This is apparent from a consideration of what happens as the longitudinal distance between planes A—A and B—B approaches zero. When the two planes coincide, there is a stress concentration and failure can be expected, from which it will be apparent that the optimum distance between the boundary planes depends upon load, angular amplitude, oscillation frequency, tube strength, Young's modulus for the material of which the tube is made, etc.

OPERATION

As the system is loaded, tube 2 turns in response, but the turning necessarily stops somewhere short of destructive failure. At a transverse plane, A—A, marking the beginning of the terminal zone, arrest of the turning begins. At that plane, deflection of tube 2 is determined solely by the characteristics of that part of the tube which is free of the anchor. As regards the terminal zone itself, deflection of the tube relative to the anchor is a maximum where the engaged elastomeric material is thickest.

At the other boundary plane, B—B, the thickness of the elastomer securing tube 2 and anchor 4 is at a minimum, and hence the deflection of tube 2 relative to anchor 4 is also at a minimum. If either elastomeric annulus is of zero thickness at plane B—B, the angular displacement of tube to anchor as to the involved adjacent surfaces is necessarily zero. If now the other elastomeric annulus has a substantial finite thickness at that plane, it will be less highly stressed than the zero thickness annulus. As a result, the zero thickness (at plane B—B) elastomer could be overloaded in some operational conditions and could shear to destruction, whereupon the other annulus would also probably be overstressed and destroyed.

Furthermore, such a condition would induce differential deflection in or across the tube wall thickness with the possibility of creating intolerable internal stresses in tube 2, and failure of the tube could result, especially if the elastomeric annuli were strong enough to resist failure.

For the reasons given, it is desirable that the two annuli be of approximately equal thickness in any given plane at right angles to the tube axis. It is noted that the two annuli are at different distances from the tube center, so that, given equal thicknesses, the outer annulus will be more highly stressed than the inner annulus. Such a difference is enhanced when the outside diameter of the tube is small and tube wall thickness is substantial, and such problems are further aggravated in marginal operating conditions.

However, these are factors which the design engineer will take into considertion. Because of the wide spectrum of sizes, loads, and conditions, it will suffice here to call attention to the more significant parameters involved, leaving it to the discretion of skilled designers to determine appropriate design details.

I wish it to be understood that I do not desire to be limited to the exact details of construction shown and described for obvious modifications will occur to a person skilled in the art.

What is claimed is:

1. In a torsional force-transmitting system: a low modulus torsion tube having at least one terminal side surface defined by spaced parallel planes A and B normal to the tube axis; a high modulus anchor having at least one axially tapered side surface radially aligned with the tube's terminal side surface; and elastic force-transmitting material interposed between each terminal side surface and each tapered side surface; said elastic material constituting the sole force-transmitting connection between the tube and anchor.

2. The system of claim 1 wherein the elastic material comprises an annulus occupying the entire axial dimension between planes A and B.

3. The system of claim 2 wherein the anchor is provided with two axially tapered side surfaces, one of said tapered surfaces being located within the tube, and the other tapered surface being located outside the tube; there being an elastic force-transmitting annulus interposed between each tapered surface and each terminal surface.

4. The system of claim 2 and further comprising means carried by the anchor for exerting an axial compressive stress on the elastic annulus.

5. The system of claim 2 wherein the elastic annulus frictionally engages the terminal surface and tapered surface; said elastic annulus being axially compressed by an annular pressure ring adjustably mounted on the anchor.

6. The system of claim 2 wherein the torsion tube is fiberglass, the anchor is metallic, and the elastic annulus is an elastomer.

7. The system of claim 2 wherein the anchor side surface tapers so that the elastic annulus has a relatively large radial thickness at plane A and a relatively small radial thickness at plane B.

8. A force transmitting system having a low-modulus tube and a high-modulus anchor secured thereto, and comprising:

a. an anchored terminal zone of said tube, provided with external and internal surfaces which are substantially circular in cross section;
b. an anchor to receive the terminal zone and comprising
  i. a socket element provided with an annular tapered socket and having an axis of symmetry substantially coincident with the axis of said tube, and open along said axis at one end, and
  ii. a nut element having threaded engagement with the socket element, whereby said external tube surface and an outer surface of said socket cooperate to form a first annular tapered space, and said internal tube surface and an inner surface of said socket cooperate to form a second annular tapered space; and
c. elastic means in said spaces securing said zone and the anchor for transmitting force between the tube and the anchor while permitting deflection of the tube relative to the anchor in which said deflection may vary throughout said zone from zero at the free end to a maximum at the opposite end of the zone.

9. A system as in claim 8, the securing means comprising an elastomeric annulus in each of said spaces.

10. A system as in claim 9, wherein the nut element is provided with a pressure ring adapted to engage the elastomeric annulus in the first annular space, whereby screwing the nut and socket elements together brings greater pressure to bear on the elastomeric annulus in said first annular space.

11. A system as in claim 10, the securing means also including:
  a. a second pressure ring for engaging the elastomeric annulus in the second annular space; and
  b. means threadedly engaging the anchor and the second pressure ring to bring the elastomeric annulus in the second annular space into tighter engagement with boundaries of the second annular space.

12. A system as in claim 11, wherein the inner and outer surfaces of the annular socket diverge toward the socket opening, forming with the tube said first and second annular spaces wedge-shaped in longitudinal section and wherein each of said elastomeric annuli is also wedge-shaped with the base of each wedge closer to the socket opening than the tip of the wedge.

13. A system as in claim 12, the annular socket having an annular groove adapted to receive the free end of the tube to prevent the flow of elastomer between said first and second annular spaces.

14. A system as in claim 9, the annular socket having an annular groove adapted to receive the free end of the tube to prevent the flow of elastomer between said first and second annular spaces.

15. A system as in claim 14, wherein the nut element is provided with a pressure ring adapted to engage the elastomeric annulus in the first annular space, whereby screwing the nut and socket elements together brings greater pressure to bear on the elastomeric annulus in said first annular space.

16. A system as in claim 15, the securing means also including:
  a. a second pressure ring for engaging the elastomeric annulus in the second annular space; and
  b. means threadedly engaging the anchor and the second pressure ring to bring the elastomeric annulus in the second annular space into tighter engagement with the boundaries of the second annular space.

17. A system as in claim 9, wherein the inner and outer sufaces of the annular socket diverge toward the socket opening, forming with the tube said first and second annular spaces wedge-shaped in longitudinal section and wherein each of said elastomeric annuli is also wedge-shaped with the base of each wedge closer to the socket opening than the tip of the wedge.

18. A system as in claim 17, the securing means also including:
  a. a pressure ring for engaging the elastomeric annulus in the second annular space; and
  b. means threadedly engaging the anchor and the pressure ring to bring the elastomeric annulus in the second annular space into tighter engagement with the boundaries of the second annular space.

* * * * *